Sept. 3, 1957 J. H. BAILEY 2,805,099
SPRINKLER HEAD ASSEMBLY AND VALVE
Filed March 3, 1953
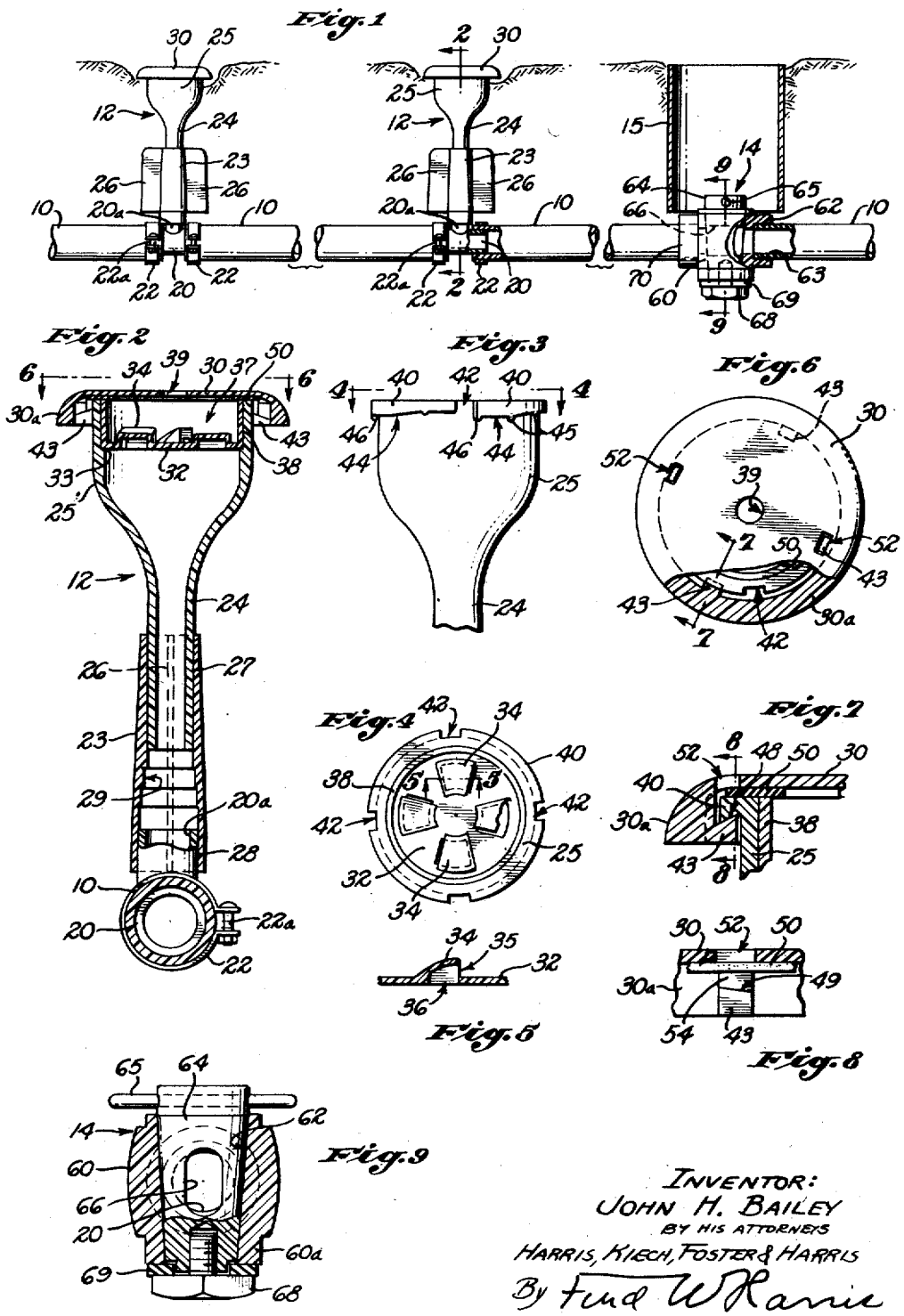
INVENTOR:
JOHN H. BAILEY
BY HIS ATTORNEYS
HARRIS, KIECH, FOSTER & HARRIS

United States Patent Office 2,805,099
Patented Sept. 3, 1957

2,805,099

SPRINKLER HEAD ASSEMBLY AND VALVE

John H. Bailey, Costa Mesa, Calif., assignor to John Martell, Santa Ana, Calif.

Application March 3, 1953, Serial No. 340,096

10 Claims. (Cl. 299—60)

This invention relates to sprinkling systems, more particularly to those imbedded in the earth for the watering of lawns and similar areas.

An object of the invention is to produce a novel, efficient, durable and economical pipe and sprinkler head assemblage, and one which is very readily installed.

Another object of the invention is to provide a novel sprinkling head structure, and it is a further object to provide on the sprinkling head means to maintain the against rocking from upright position when installed.

Another object of the invention is to employ a tough plastic material for the various parts of the assembly, and to present constructions which are well adapted for production from such a plastic substance.

Other objects of the invention and the various features thereof will become apparent to those skilled in the art upon reference to the following specification and the accompanying drawing wherein certain embodiments are illustrated.

In the drawing:

Fig. 1 is an elevation showing, in assembled relation, a plurality of sprinkler heads of this invention installed in operative relation on a plurality of pipe lengths and in conjunction with a control valve for the water supply;

Fig. 2 is a vertical section taken as indicated by the line 2—2 of Fig. 1 and detailing various features of construction of the sprinkler head;

Fig. 3 is an elevation of the upper portion of the sprinkler head itself as seen from the right of Fig. 2, the top spray plate being removed;

Fig. 4 is a top plan as indicated by the line 4—4 of Fig. 3;

Fig. 5 is a vertical sectional detail indicated by the line 5—5 of Fig. 4;

Fig. 6 is a top plan view of the sprinkler head as indicated by the line 6—6 of Fig. 2, a portion being broken away;

Fig. 7 is a vertical sectional detail on an enlarged scale as indicated by the line 7—7 of Fig. 6;

Fig. 8 is a vertical sectional detail approximately as indicated by the line 8—8 of Fig. 7; and Fig. 9 is a vertical section through the control valve seen in Fig. 1, approximately as indicated by the line 9—9 of Fig. 1.

The various parts of the system of this invention as shown are produced from a tough plastic material or materials of the thermosetting type which have limited yielding characteristics and are therefore highly resistant to cracking or other permanent distortion. Such plastic materials include the polystyrenes and co-polymers of styrene, suitable vinyl polymers or co-polymers such as the vinyl chloride polymers and co-polymers, and other synthetic resins of the indicated type or other type appropriate for the purpose and sufficiently economical. I have used satisfactorily polyvinyl chloride tubing and for the spray heads the cellulose acetate type in a form sold on the market as "Tenite #11," but others of the indicated types also are useful for these purposes. Polyethylene pipe is useful.

The combination as illustrated includes lengths 10 of plastic pipe carrying a plurality of plastic spray heads generally indicated at 12 and a valve 14 formed from appropriate plastic material, these parts being normally located in the earth as illustrated in Fig. 1 to position the tops of the spray heads flush with the soil, a well 15 being provided for convenient access to the valve 14.

Secured between the various pipe lengths 10 as shown are T's 20, the ends of the pipe lengths 10 being fitted over the aligned ends of the T's 20 and secured thereon as by cementing or by metal or other appropriate clamps 22 of conventional construction employing small bolts 22a to bind the parts in permanent relationship as illustrated in Figs. 1 and 2. If desired, both cementing and clamping may be employed for the purpose. Each T 20 is provided with the usual upstanding neck or stem 20a, over which there is fitted the lower end of a tapered, upstanding plastic spacer tube or connecting section 23 which carries at its upper end a tubular shank or stem portion 24 integral with the flared or enlarged body portion 25 of its spray head. Opposite side portions of the connecting section 23 are provided with upstanding, integral wings 26 which serve as resistance means or stops which are assembled in line with the axis of the pipe lengths 10 whereby to prevent lateral rotation or swinging movement of the spray heads 12 and the pipe lengths 10 with which they are connected. The joint 27 between the upper end of the connecting section 23 and the lower end of the stem 24, and the joint indicated at 28 between the lower end of the section 23 and the upstanding neck 20a of the T 20, are made water tight by any appropriate means such as cementing or the use of a solvent which in effect produces a cemented joint. To obtain an effectual internal tapering of the connecting section 23 to correspond with the external tapering thereof, the internal lower wall portion of the section 23 may be stepped as indicated at 29.

The flared spray head body 25 has removably carried on the top thereof a cover plate 30 which acts also as a spray cap working in conjunction with an underlying, spaced, distributor cup 32 which seats upon an annular shoulder 33 within the body 25. The cup 32 is molded with a plurality of upwardly inclined circumferentially directed hoods 34 on the upper side of the plate which are integral with the plate portion of the cup 32 at three sides, but provide circumferentially directed outlet ports 35 that are supplied by underlying water passages 36 formed through the plate portion of the cup 32. Thus, water passing up through the stem 24 enters the passages 36 and is then directed by the hoods 34 and the outlet ports 35 in a rotary direction to produce a swirling action of the water in a chamber 37 between the cup 32 and the cover plate 30. An upstanding annular wall or flange 38 integral with the plate portion of the cup 32 serves as spacing means with respect to the cover plate 30 and maintains the cup 32 on its seat 33 against the pressure of the rising stream of water. The cover plate 30 is provided with a central discharge passage or spray opening 39. Since the hoods 34 and the outlet ports 35 of the distributing cup 32 are disposed radially outward of the center of the cup 32, and, since the opening 39 in the cover plate 30 is centrally disposed, the rotary or swirling movement of the water in the chamber 37 produces an outwardly directed water spray as the water leaves the opening 39.

The spray cover plate 30 is secured to the body 25 of the spray head through the medium of outwardly directed flanges 40 integral with the spray head body 25, these flanges 40 being spaced by vertical passages or notches 42 adapted to pass corresponding, internal locking lugs 43 carried by a relatively massive, integral overhanging flange 30a of the cover plate 30. There is a plurality of the flanges 40 and a corresponding plurality of the locking lugs 43, which as illustrated are four in number. When the locking lugs 43 are passed downward through the notches 42, they reach a position slightly below adjacent, shallow ends of the flanges 40 which are inclined downward in one direction to provide inclined wedge walls or faces 44. Thus, upon rotation of the cover plate 30 and the locking lugs 43 clockwise as seen in the figures, the lugs 43 are caused to ride along the inclined faces 44 to effect a binding action retaining the spray head cap or cover plate 30 in operative position. Very small, downwardly directed detents 45 on each inclined face 44 are provided over which the locking lugs 43 may ride to insure retention in binding position. These detents 45 are somewhat exaggerated in the showing of Fig. 3. In addition to the detents 45, the lowermost portion of the inclined wall 44 of each flange member 40 is provided with a depending stop 46 to limit rotation of the cover plate 30 and its lugs 43.

In order to effect more positive binding of the lugs 43 in position on the inclined faces 44 of the flanges 40 carried by the spray head body 25, each circumferentially inclined face 44 is additionally sloped upward and inward as indicated at 48 in Fig. 7, and the upper face of each locking lug 43 of the plate 30 is correspondingly sloped downward and outward to cooperate with the described inclination of the under side of each flange 40, and is additionally sloped circumferentially downward as indicated at 49 in Fig. 8 to correspond with the inclination of the inclined faces 44 of the flanges 40. By these face arrangements very positive locking between the lugs 43 and the under sides of the flanges 40 is assured, especially in the light of the characteristics of the plastic materials of which the parts are formed to bind together adequately under the described circumstances. In addition, a thin rubber gasket 50 is provided in the flanged cover plate 30, being retained by the lugs 43 when the cover plate 30 is removed. When the cover plate 30 is applied, as seen in Figs. 2, 7 and 8, the gasket 50 bears upon the upper end of the spray head body 25 and the upper faces of the flanges 40, thereby providing for a tight seal at this joint and also providing tension between the binding faces 48 and 49 of the flanges 40 and locking lugs 43, compression of such gasket 50 permitting riding of the lugs 43 over the small detents 45. In practice, especially from the molding standpoint, it has been found desirable to provide small openings 52 through the cover plate 30 at positions overlying the locking lugs 43. These openings 52 may be partially or wholly underlain by the gasket 50 and thereby partially closed as illustrated or wholly closed if desired. It is deemed advantageous to provide some space between the outer edge of each of the flanges 40 and the opposing inner vertical wall of the flange 30a of the cover plate 30, and, at the positions of the lugs 43, it appears desirable to provide a shallow upward continuation of each lug 43 as indicated at 54 in Fig. 8, each such continuation 54 projecting radially inward a portion of the distance toward the respective flange 40 to provide a spacing, bearing face for the edge of the respective flange 40 as the cover plate 30 is turned into locking position.

As illustrated at the right of Fig. 1 and in Fig. 9, a cut-off valve 14, also preferably constructed of plastic materials, is employed between opposing pipe lengths 10, one of which is connected with the water source. This valve 14 comprises a valve body 60 having a tapered bore 62 which receives a valve barrel or plug 64 correspondingly tapered. The upper end of the plug 64 is exposed and receives a cross handle 65 which is made accessible by reason of the well 15 disposed in the earth in alignment with the valve 14. The valve plug 64 is provided with a transverse flow passage 66 adapted to communicate with the adjacent pipe lengths 10 when the spray heads are to be supplied with water, and to be moved to a transverse position to cut off water flow through the medium of the handle 65. To retain the plug 64 in operative position, a screw 68, which also may be of plastic material, is threaded into a corresponding seat in the lower end of the plug 64, and a compression washer 69, which may be of rubber, or of a moderately soft plastic material, is used between the head of the screw 68 and the lower transverse face of a downward extension 60a of the valve body 60. For the purpose of connection of the pipe lengths 10 to the valve 14, the valve body 60 is provided with integral coupling sleeves 70 which snugly receive within them the respective pipe ends. Desirably the pipe ends are externally threaded and the sleeves 70 are internally threaded as seen at 63. In addition a cement or an appropriate solvent may be applied to the threads as the parts are being threadedly connected. However, such cement or solvent may be used alone to provide the required water tight seal.

From the foregoing it will be seen that I have provided a sprinkling system which may be made entirely of appropriate plastic materials, with the possible exception that the handle 65 which would ordinarily be made of metal, if separate, or would be molded as a part of the top of the plug 64 if integral. Other possible exceptions are the above-mentioned gasket 50 and washer 69 which may be of either rubber or synthetic plastic of the character described, and the clamps 22 which, if used, preferably will be of metal or equivalent material.

While I have illustrated certain preferred embodiments of my invention, it is intended to cover such modifications as fall within the scope of the patent claims.

I claim as my invention:

1. In combination in a sprinkling system: pipe lengths; a T having ends of said pipe lengths affixed to the aligned ends thereof; a tubular connecting section having one end sealed to the stem of the T; a spray head having a hollow shank sealed at one end to the other end of said connecting section, said tubular section having external wings in the plane of said pipe lengths to prevent rotation of said spray head about the axis of said pipe lengths; and spraying means carried by the other end of said spray head.

2. In combination in a sprinkling system to be embedded in earth: plural pipe lengths; a T of tough yieldable plastic material having aligned ends attached to such pipe lengths; a tubular stem section of tough yieldable plastic material sealed by a cementing agent producing an inseparable joint to an upstanding stem of said T in upstanding relation; spray means carried by the upper end of said stem section; and wing means carried by the stem section in alignment with the axis of said pipe lengths to resist swinging movement of said spray means and stem section in the earth about said axis.

3. A combination as in claim 2 including a valve of tough pressure-holding material disposed between two of said pipe lengths, said valve having a valve head and a valve barrel rotatable therein, said head having ends connected with said two pipe lengths, and said barrel having upwardly directed means accessible for rotation thereof.

4. In combination in a sprinkling system: an upstanding tubular stem member to be mounted on a water pipe; an enlarged spray head carried on said stem member; and an apertured spray head cover plate mounted on said spray head, said spray head peripherally carrying spaced flange means providing upwardly and inwardly directed inclined binding faces, and said cover plate having overhanging flange means provided with spaced, inwardly directed locking lugs, said lugs being spaced downward from said cover plate and having upper faces which are inclined radially outward and downward to engage and lock against said inclined binding faces of said flange means and clamp said cover plate against said flange means of said spray head, said spaced flange means of said spray head being inclined circumferentially on their under faces to assist locking action, and said circumferentially inclined faces being provided with downwardly directed detent means to be overridden by said lugs and insure retention in locking position.

5. In combination in a sprinkling system: a spray head having an upstanding water-receiving tubular stem and providing an enlarged upper body member; a spray cap mounted on said body member; radially outwardly directed flange means on said body member; and inwardly directed spaced lugs on said cap and adapted to be passed downward through passages through said flange means and rotatable with said cap into position to underlie said flange means, said flange means having inclined binding faces to be engaged by said lugs upon rotation thereof to retain the cap in fixed position, said inclined binding faces being both circumferentially inclined and radially inwardly and upwardly inclined, said lugs having their upper faces radially outwardly and downwardly inclined to cooperate with the upward and inward inclination of said binding faces of said flange means, said spray cap having a depending flange carrying said lugs, and upward extensions of said lugs being provided to serve as bearings for said flange means upon relative rotation.

6. In combination in a sprinkling system: pipe lengths; a T having ends of said pipe lengths affixed to the aligned ends thereof; a tubular connecting section having one end sealed to the stem of the T; a spray head having a hollow shank sealed at one end to the other end of said connecting section, said tubular connecting section and said hollow shank being tough yieldable plastic material sealed together by a cementing agent producing an inseparable joint, said ends of said tubular connecting section being disposed around the respective ends of said shank and said stem of said T, said connecting section being internally stepped to reduce the internal diameter from a larger diameter of said stem to a smaller diameter of said shank; and spraying means carried by the other end of said spray head.

7. A combination as in claim 6 wherein said T is formed of tough yieldable plastic material, and said tubular connecting section is sealed to said stem by a cementing agent producing an inseparable joint.

8. A combination as in claim 7 wherein said pipe lengths are formed from tough yieldable plastic material and are secured to said T by a cementing agent producing inseparable joints.

9. In combination in a sprinkling system: a spray head having an upstanding water-receiving tubular stem and providing an enlarged upper body member; a spray cap mounted on said body member; radially outwardly directed flange means on said body member; and inwardly directed spaced lugs on said cap and adapted to be passed downward through passages through said flange means and rotatable with said cap into position to underlie said flange means, said flange means having inclined binding faces to be engaged by said lugs upon rotation thereof to retain the cap in fixed position, downwardly directed detents being provided on said inclined binding faces to be overridden by said lugs upon rotation thereof for maintaining the binding relationship.

10. A combination as in claim 9 including depending stops on said inclined faces to limit rotation of said cap lugs.

References Cited in the file of this patent

UNITED STATES PATENTS

| | | |
|---|---|---|
| 1,105,993 | Munson | Aug. 4, 1914 |
| 1,192,743 | Brooks | July 25, 1916 |
| 1,710,844 | Sherman | Apr. 30, 1929 |
| 2,065,161 | Thompson | Dec. 22, 1936 |
| 2,595,598 | Morton | May 6, 1952 |
| 2,608,318 | Keller | Aug. 26, 1952 |
| 2,665,028 | Hintz | Jan. 5, 1954 |
| 2,706,134 | Wilson et al. | Apr. 12, 1955 |

UNITED STATES PATENT OFFICE

CERTIFICATE OF CORRECTION

Patent No. 2,805,099                  September 3, 1957

John H. Bailey

It is hereby certified that error appears in the printed specification of the above numbered patent requiring correction and that the said Letters Patent should read as corrected below.

Column 1, line 24, before "against" insert -- head --; column 6, line 27, before "lugs" insert -- and --.

Signed and sealed this 5th day of November 1957.

(SEAL)
Attest:
KARL H. AXLINE
Attesting Officer

ROBERT C. WATSON
Commissioner of Patents